(12) United States Patent
Paul (10) Patent No.: US 9,038,595 B2
(45) Date of Patent: May 26, 2015

(54) CARBON OXYGEN HYDROGEN MOTOR

(76) Inventor: Buddy Ray Paul, Slidell, LA (US)

( * ) Notice: Subject to any disclaimer, the term of this patent is extended or adjusted under 35 U.S.C. 154(b) by 552 days.

(21) Appl. No.: 13/444,594

(22) Filed: Apr. 11, 2012

(65) Prior Publication Data

US 2012/0255518 A1  Oct. 11, 2012

Related U.S. Application Data

(60) Provisional application No. 61/474,147, filed on Apr. 11, 2011.

(51) Int. Cl.
| | | |
|---|---|---|
| *F02B 45/00* | (2006.01) | |
| *F02M 43/00* | (2006.01) | |
| *F02D 19/02* | (2006.01) | |
| *F02B 43/10* | (2006.01) | |
| *F02M 21/02* | (2006.01) | |
| *F02D 19/12* | (2006.01) | |

(52) U.S. Cl.
CPC ................. *F02D 19/02* (2013.01); *F02B 43/10* (2013.01); *F02M 21/0206* (2013.01); *F02D 19/12* (2013.01); *Y02T 10/32* (2013.01)

(58) Field of Classification Search
CPC . F02D 41/0025; F02D 41/402; F02D 19/081; F02F 3/00; F02F 3/22; F02P 2060/02; F02P 2060/04; F02P 2060/081; Y02T 10/44; Y02T 10/125

USPC ............ 123/1 A, 27 GE, 45 A, 41.29, 193.1, 123/193.6, 197.4, 299–302, 525, 575

See application file for complete search history.

(56) References Cited

U.S. PATENT DOCUMENTS

| | | | | |
|---|---|---|---|---|
| 3,608,529 | A * | 9/1971 | Smith et al. .................. | 123/25 C |
| 4,484,082 | A * | 11/1984 | Bucknam ...................... | 290/1 R |
| 5,400,746 | A * | 3/1995 | Susa et al. .................... | 123/25 C |
| 7,958,872 | B1 * | 6/2011 | Schechter ................ | 123/568.11 |
| 8,151,553 | B1 * | 4/2012 | Schechter ........................ | 60/279 |
| 8,436,489 | B2 * | 5/2013 | Stahlkopf et al. ............... | 307/43 |
| 2013/0098329 | A1 * | 4/2013 | Chipperfield .............. | 123/193.4 |

* cited by examiner

*Primary Examiner* — John Kwon
*Assistant Examiner* — Johnny H Hoang (57) ABSTRACT

A carbon oxygen hydrogen motor comprises an enclosure, a combustion chamber, and a plurality of injectors. A rotational crank is positioned within the enclosure and connected with a piston. The piston is positioned within the combustion chamber and connected to the rotational crank by a rod. A stream of hydrogen gas, oxygen gas, and carbon dioxide gas enter into the combustion chamber through the plurality of injectors. A spark plug, which is connected to the combustion chamber, ignites hydrogen gas, oxygen gas, and carbon dioxide gas inside the combustion chamber causing a reaction. The reaction moves the piston upward. After the reaction has taken place, the piston moves downward. The downward motion of the piston ejects all of the byproducts from the reaction through a ejecting valve located in the combustion chamber. Since the piston is connected with the rotational crank, the rotational crank rotates in cycles creating mechanical energy.

6 Claims, 11 Drawing Sheets

CARBON OXYGEN HYDROGEN MOTOR

The current application claims a priority to the U.S. Provisional Patent application Ser. No. 61/474,147 filed on Apr. 11, 2011.

FIELD OF THE INVENTION

The present invention relates generally to an apparatus and a method that can transform carbon dioxide into carbon monoxide, or methane and generate highly efficient electrical or mechanical power in the process.

BACKGROUND OF THE INVENTION

Increasing amount of carbon dioxide in the atmosphere and the increasing gasoline prices force the modern researchers to create alternative energy producing methods or more efficient energy methods, such as hybrid engines and electric engines. The present invention, a carbon oxygen hydrogen motor, is an apparatus provides means to enhance the amount of energy that can be achieved with a specific amount of fuel. The present invention has the means to control the environmental effects of green house gasses by reducing the amount of carbon dioxide in the atmosphere. The present invention also operates without using gasoline. The specific amount of fuel used in the present invention is carbon dioxide gas, oxygen gas, and hydrogen gas. Generated pressure from the present invention is used to drive a mechanical device or generator creating energy.

DETAILED DESCRIPTIONS OF THE INVENTION

All illustrations of the drawings are for the purpose of describing selected versions of the present invention and are not intended to limit the scope of the present invention.

Figure 6:
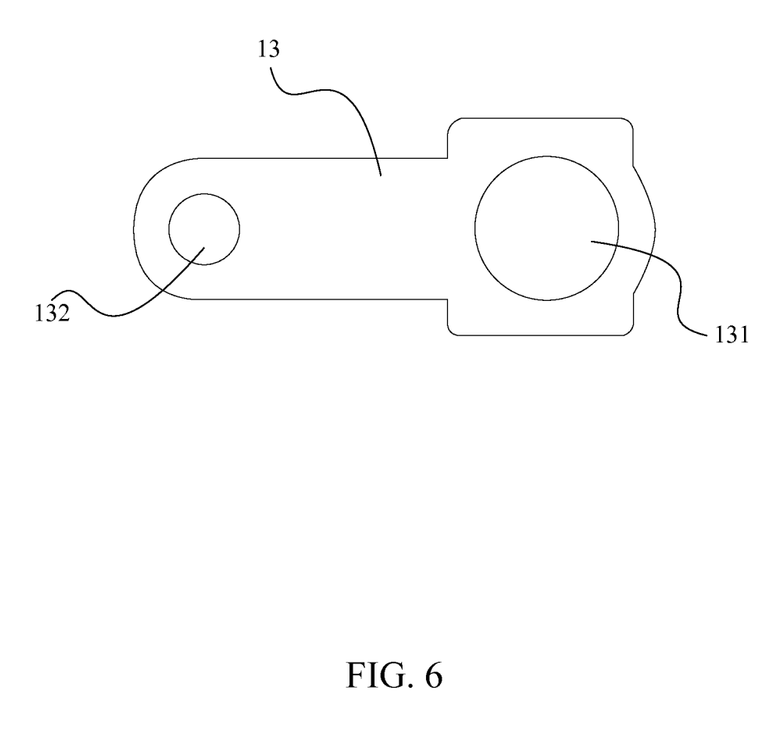
FIG. 6 is a view of a rod in the present invention showing a first opening and second opening.
Figure 7:
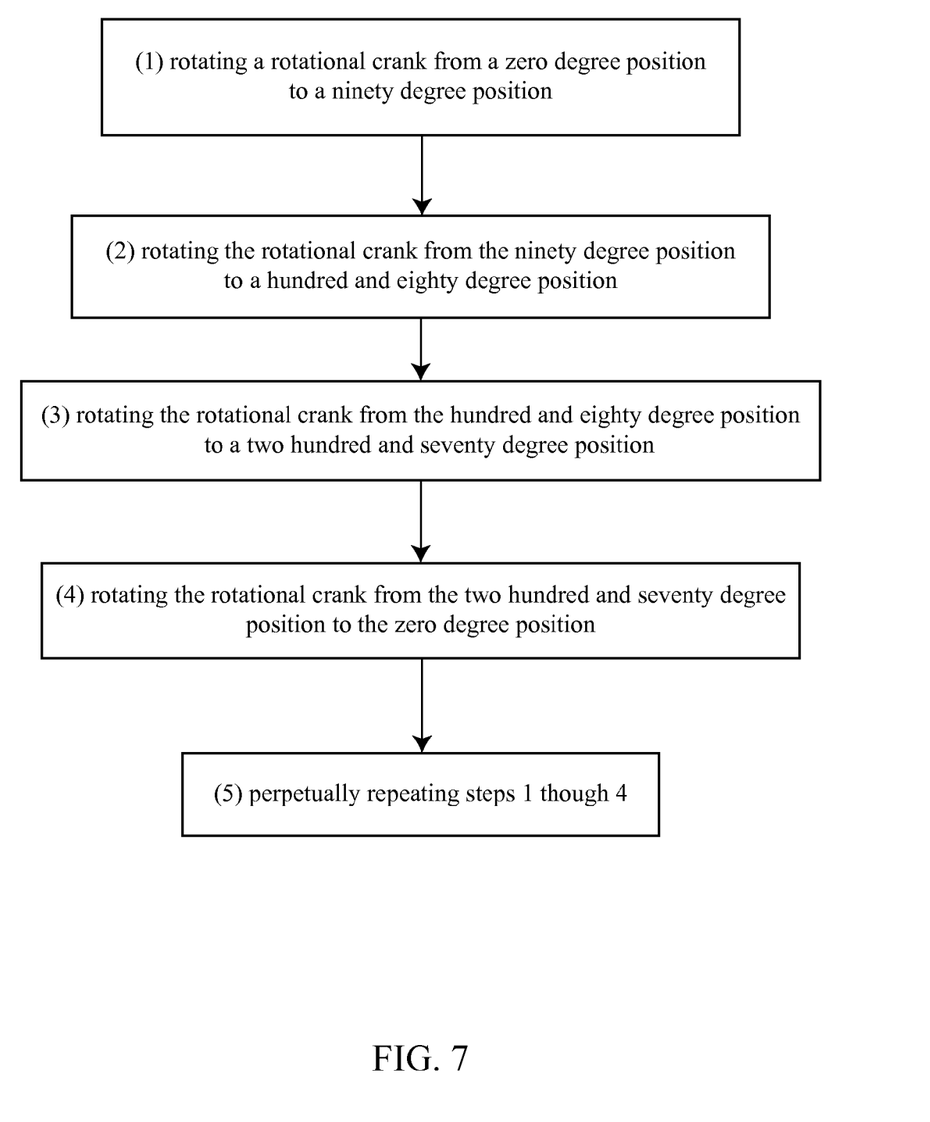
FIG. 7 is a flow chart illustrating the overall process that is followed by the present invention.
Figure 8:
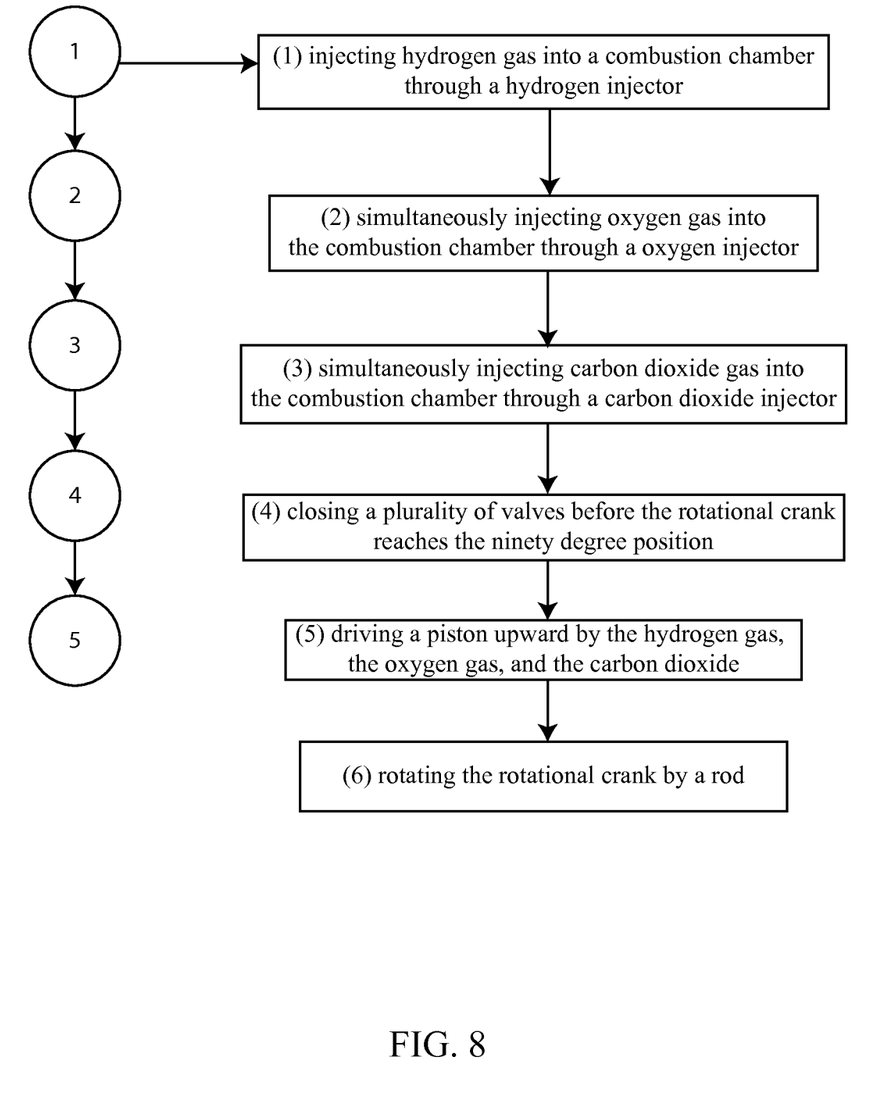
FIG. 8 is a flow chart illustrating the process follows by the first step of the present invention.
Figure 9:
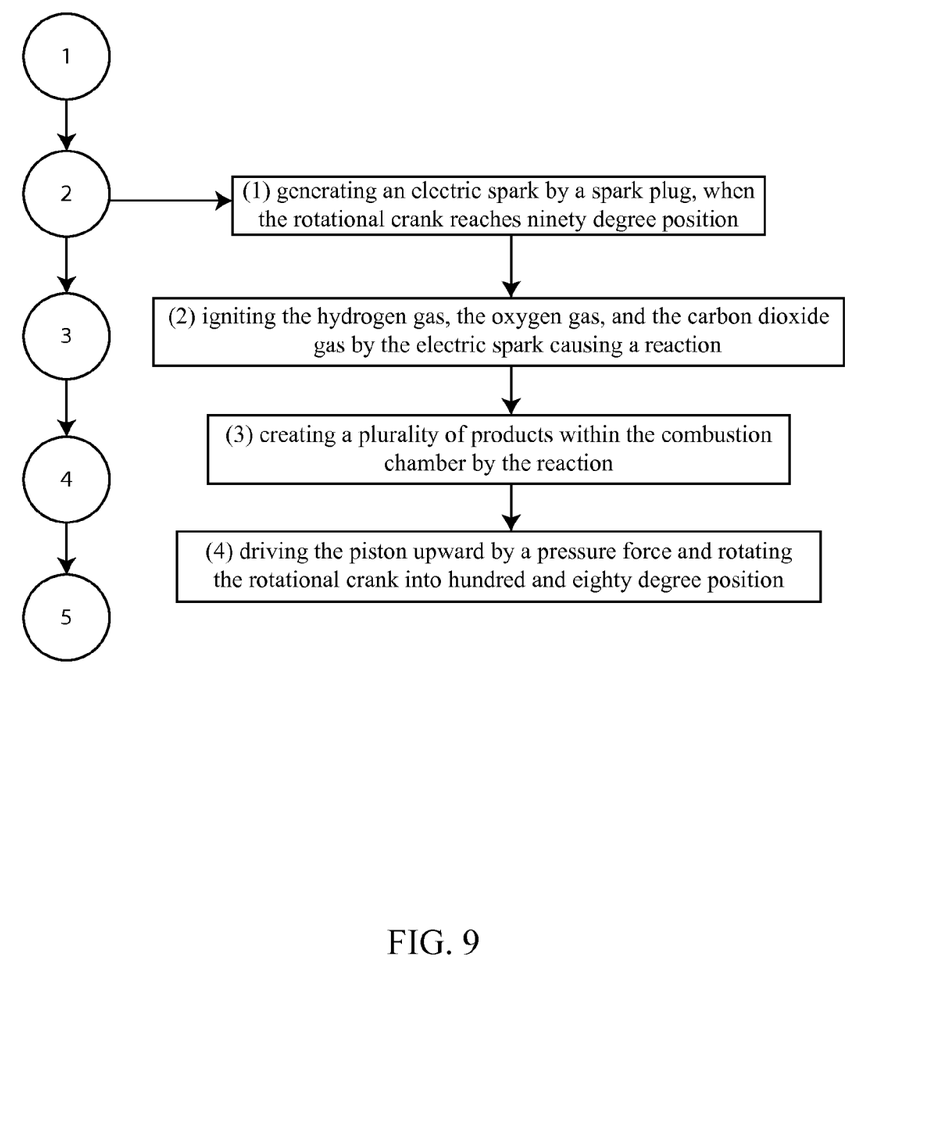
FIG. 9 is a flow chart illustrating the process follows by the second step of the present invention.
Figure 10:
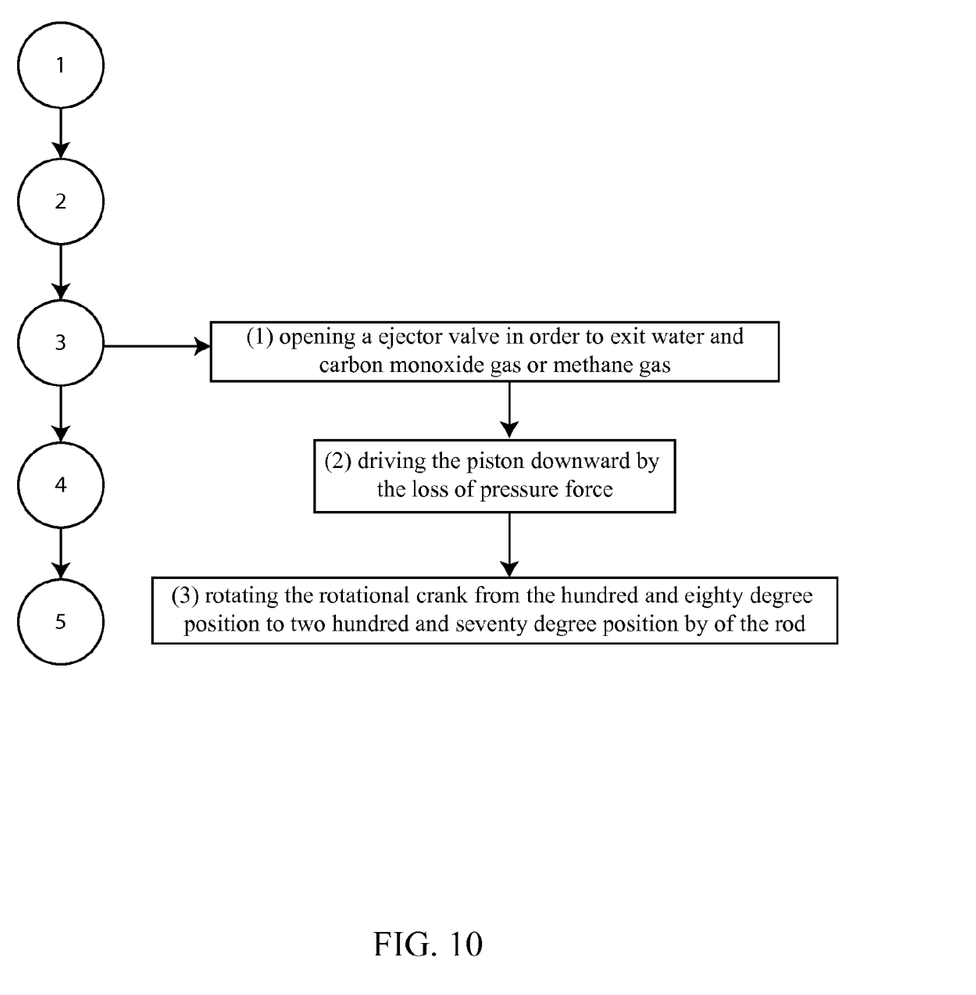
FIG. 10 is a flow chart illustrating the process follows by the third step of the present invention.
Figure 11:
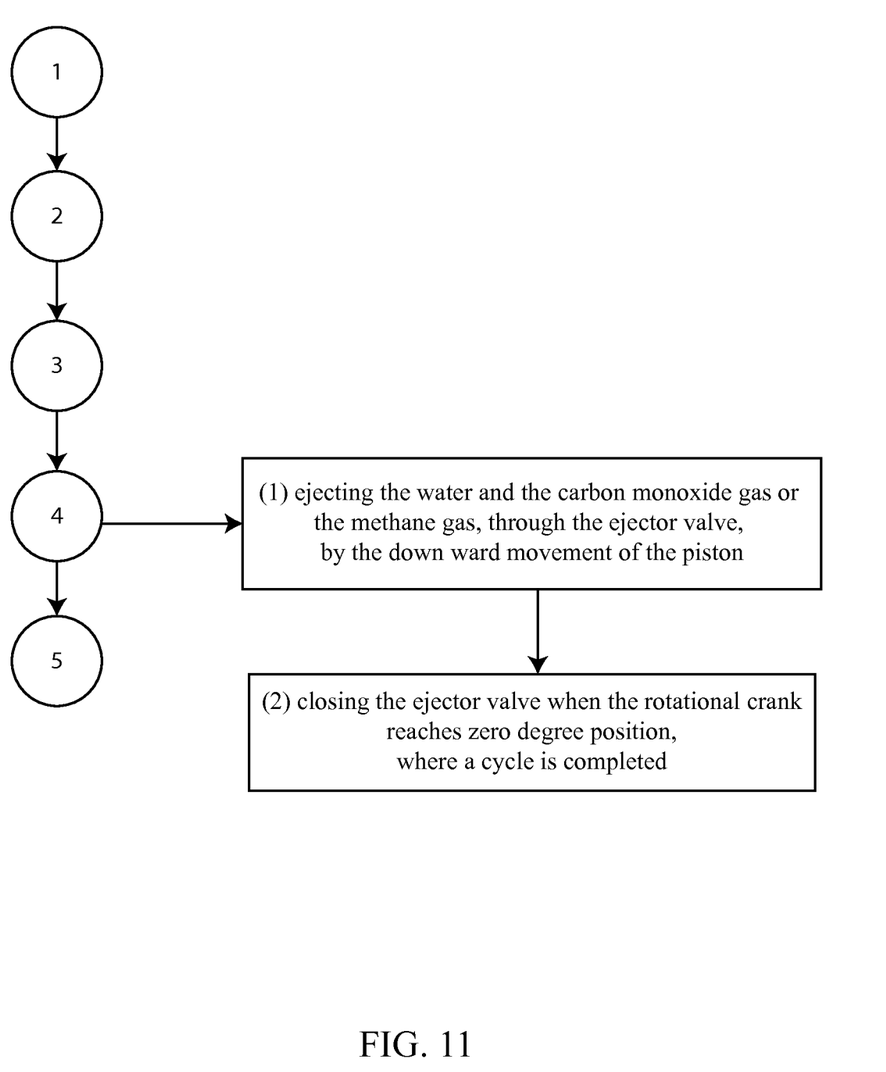
FIG. 11 is a flow chart illustrating the process follows by the fourth step of the present invention.

The present invention comprises an enclosure 1, a combustion chamber 2, and a plurality of injectors 3. The enclosure 1 is connected to the combustion chamber 2 and the plurality of injectors 3 is positioned on the combustion chamber 2. The enclosure 1 comprises a housing 11, a rotational crank 12, and a rod 13. The housing 11 comprises a crank opening 111 and the rotational crank 12 is positioned within the crank opening 111. The rotational crank 12 comprises a rod connector 121 which is positioned stationary on the rotational crank 12. In reference to FIG. 6, the rod 13 comprises a first opening 131 and a second opening 132. The first opening 131 of the rod 13 is concentrically connected with the rod connector 121 but the connection between the rod 13 and the rod connector 121 allows the rod 13 to freely move around the rod connector 121.

Figure 2:
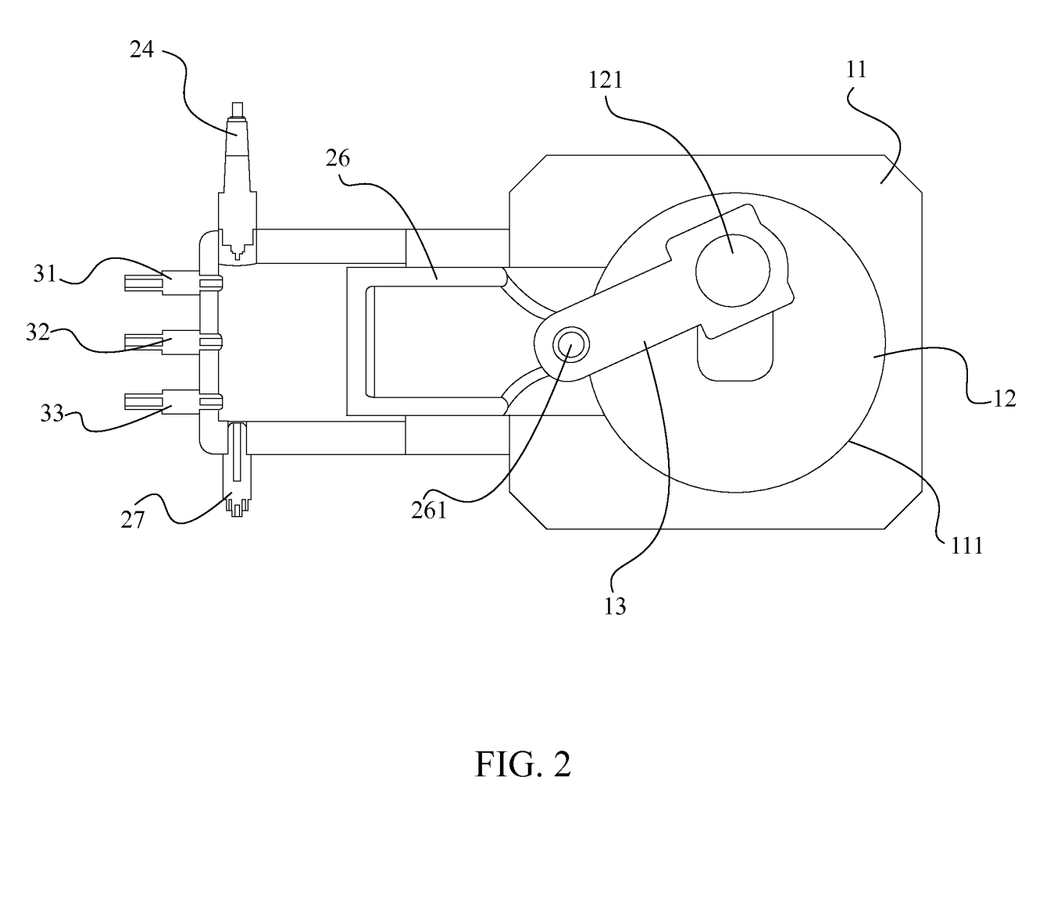
FIG. 2 is a view of the present invention in ninety degree position.

In reference to FIG. 2, the combustion chamber 2 is connected to the enclosure 1, and the combustion chamber 2 is completed with a hermetic sealed. The combustion chamber 2 comprises a plurality of openings, a spark plug 24, a piston 26, and a ejector valve 27. The piston 26 is positioned inside the combustion chamber 2. The piston 26 comprises a piston connector 261. The piston connector 261 is traversed through the second opening 132 connecting the rotational crank 12 to the piston 26. The connection between the second opening 132 and the piston connector 261 allows the rod 13 to freely move around the piston connector 261. Since the rotational crank 12 and the piston 26 is interconnected by the rod 13, a single up and down motion of the piston 26 rotates the rotational crank 12 360 degrees inside the crank opening 111. The plurality of openings is positioned around the combustion chamber 2 so that the plurality of injector, the spark plug 24, and the ejector valve 27 can be connected to the combustion chamber 2. The plurality of openings creates a tunnel connecting inside of the combustion chamber 2 and outside surface of the combustion chamber 2.

Figure 5:
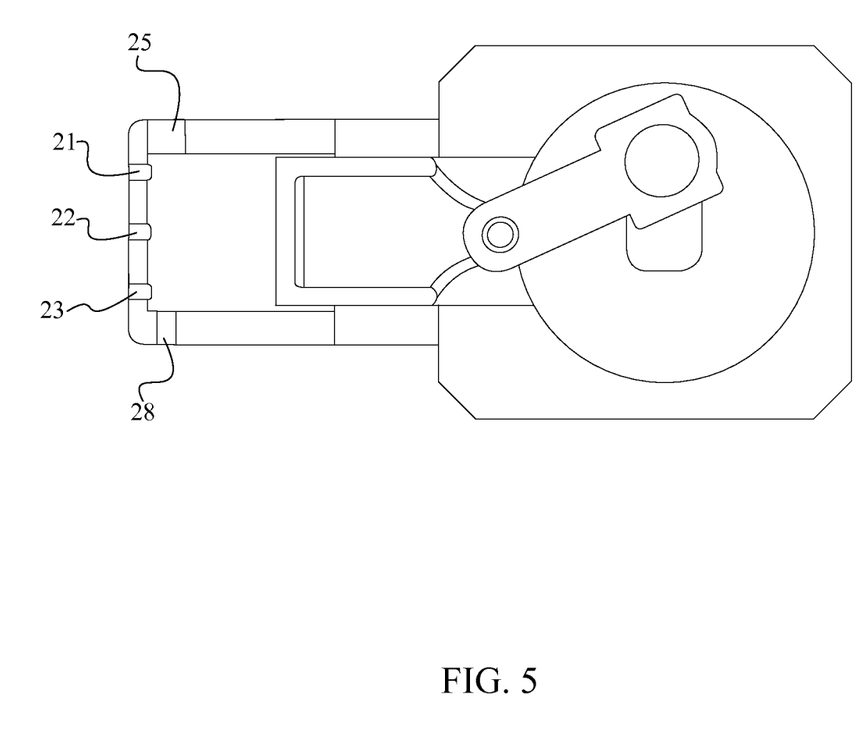
FIG. 5 is a view of the present invention showing a plurality of openings.

In reference to FIG. 5, the plurality of openings comprises a hydrogen injector chamber opening 21, an oxygen injector chamber opening 22, a carbon dioxide injector chamber opening 23, a spark plug chamber opening 25, and a ejector valve chamber opening 28. The hydrogen injector chamber opening 21, the oxygen injector chamber opening 22, and the carbon dioxide injector chamber opening 23 are adjacently positioned on the combustion chamber 2, below the piston 26. The spark plug chamber opening 28 is positioned perpendicular to the hydrogen injector chamber opening 21, and the ejector valve chamber opening 28 is oppositely positioned from the spark plug chamber opening 28.

Figure 1:
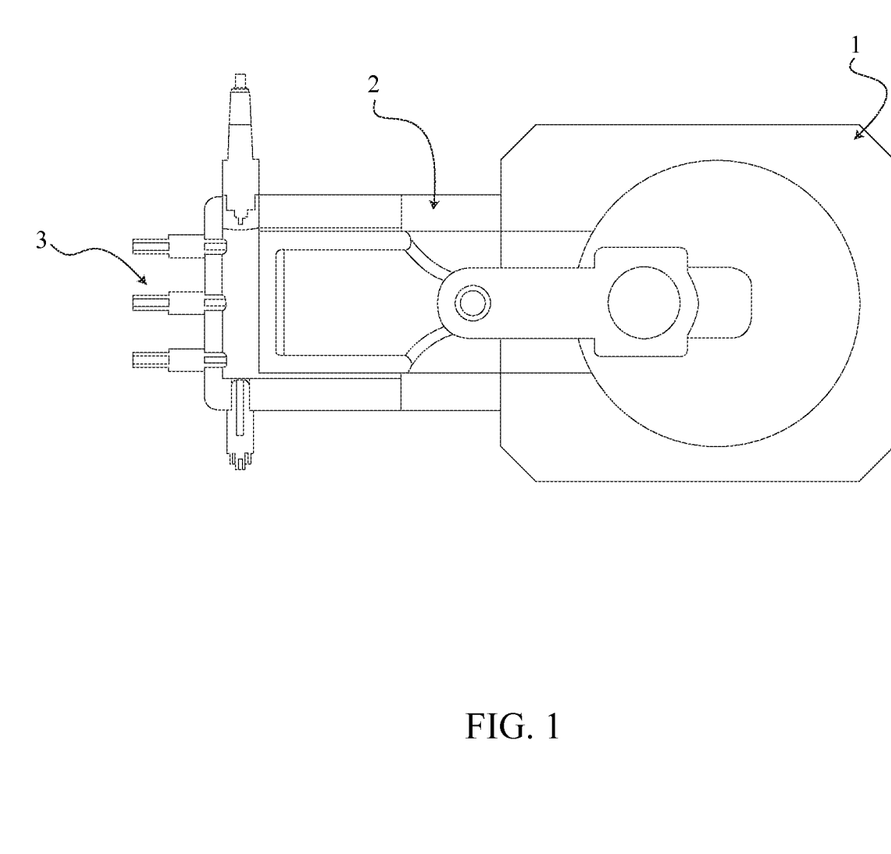
FIG. 1 is a view of the present invention in zero degree position.

The plurality of injectors 3 comprises a hydrogen injector 31, an oxygen injector 32, and a carbon dioxide injector 33. The hydrogen injector 31 is hermetically traversed through the hydrogen injector chamber opening 21. The hydrogen injector 31 comprises a hydrogen injector inside opening 311 and a hydrogen injector outside opening 312. The hydrogen injector inside opening 311 is positioned within the combustion chamber 2 and the hydrogen injector outside opening 312 is positioned outside of the combustion chamber 2. The oxygen injector 32 is hermetically traversed through the oxygen injector chamber opening 22. The oxygen injector 32 comprises an oxygen injector inside opening 321 and an oxygen injector outside opening 322. The oxygen injector inside opening 321 is positioned within the combustion chamber 2 and the oxygen injector outside opening 322 is positioned outside of the combustion chamber 2. The carbon dioxide injector 33 is hermetically traversed through the carbon dioxide injector chamber opening 23. The carbon dioxide injector 33 comprises a carbon dioxide injector inside opening 331 and a carbon dioxide injector outside opening 332. The carbon dioxide injector inside opening 331 is positioned within the combustion chamber 2 and the carbon dioxide injector outside opening 332 is positioned outside of the combustion chamber 2. In reference to FIG. 1, At zero degree position, the plurality of injectors 3 are always opened to the combustion chamber 2. The zero degree position occurs within the present invention, when the rod connector 121 makes a zero degree angle with the piston connector 261, and the piston 26 is positioned next to the plurality of injectors 3. Then the hydrogen injector 31, the oxygen injector 32, and the carbon dioxide injector 33 supply a stream of hydrogen gas, oxygen gas, and carbon dioxide gas into the combustion chamber 2, respectively. In reference to FIG. 1 and FIG. 2, the stream of hydrogen gas, oxygen gas, and carbon dioxide gas enter into the combustion chamber 2 until the rotational crank 12 moves from the zero degree position to ninety degree position. The ninety degree position occurs within the present invention, when the rod connector 121 makes a ninety degree angle with the piston connector 261 in the clockwise direction, and the piston 26 is positioned away from the plurality of injectors 3.

The spark plug 24 is inserted within the spark plug chamber opening 25. The spark plug 24 functions as a traditional electric spark plug so that the spark plug is able 24 create a electric spark inside the combustion chamber 2. When the rotational crank 12 is at ninety degree position, the spark plug 24 creates the electric spark inside the combustion chamber 2. Then the electric spark ignites the hydrogen gas, oxygen gas, and carbon dioxide gas inside the combustion chamber 2 creating a reaction. Before the spark plug 24 creates the electric spark, the plurality of injectors 3 is closed so that the stream of hydrogen gas, oxygen gas, and carbon dioxide gas are stopped. The plurality of injectors 3 needs to be completely closed before the rotational crank 12 reaches ninety degree position so that the reaction does not take place inside the plurality of valves. The reaction can be done with two different methods which are identify as a first method and second method hereafter. In order for the first method and the second method to take place, precise amount of reactant entities have to be present inside the combustion chamber 2. The first method includes four parts hydrogen gas, one part of oxygen gas, and one part of carbon dioxide gas as the reactant entities. Then the first method yields heat, pressure, water, and carbon monoxide gas as product entities. The balance chemical equation for the first method is listed below.

$$4H+O+CO_2 \rightarrow 2H_2O+CO$$

The second method includes ten parts of hydrogen gas, one part of oxygen gas, and one part of carbon dioxide gas as the reactant entities. Then the second method yields heat, pressure, water, and methane gas as the product entities. The balance chemical equation for the second method is listed below.

$$10H+O+CO_2 \rightarrow 3H_2O+CH_4$$

Figure 3:
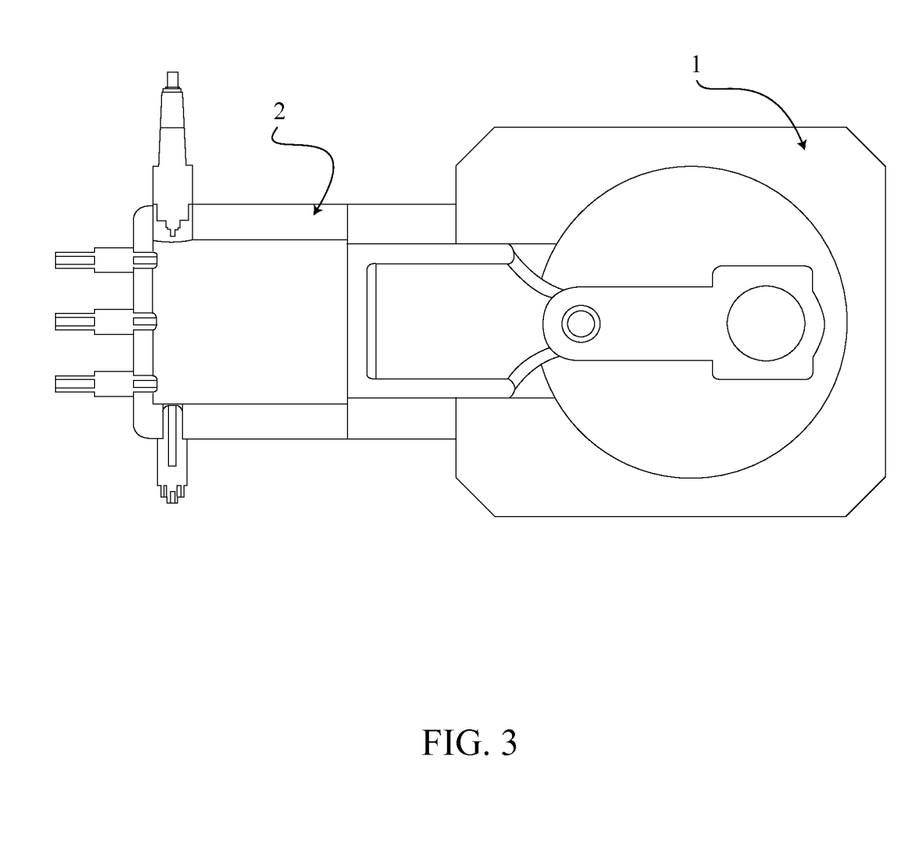
FIG. 3 is a view of the present invention in hundred and eighty degree position.

The pressure and heat from the reaction drive the piston 26 upward transferring motive forces to the rotational crank 12 through the rod 13. The heat and pressure continuously pushes the piston 26 until the reaction is completely finished. In reference to FIG. 3, when the rotational crank 12 moves to hundred and eighty degree position, the combustion chamber 2 is filled with water and carbon monoxide gas or methane gas. The hundred and eighty degree position occurs within the present invention, when the rod connector 121 makes a hundred and eighty degree angle with the piston connector 261 in the clockwise direction, and the piston 26 is positioned away from the plurality of injectors 3.

Figure 4:
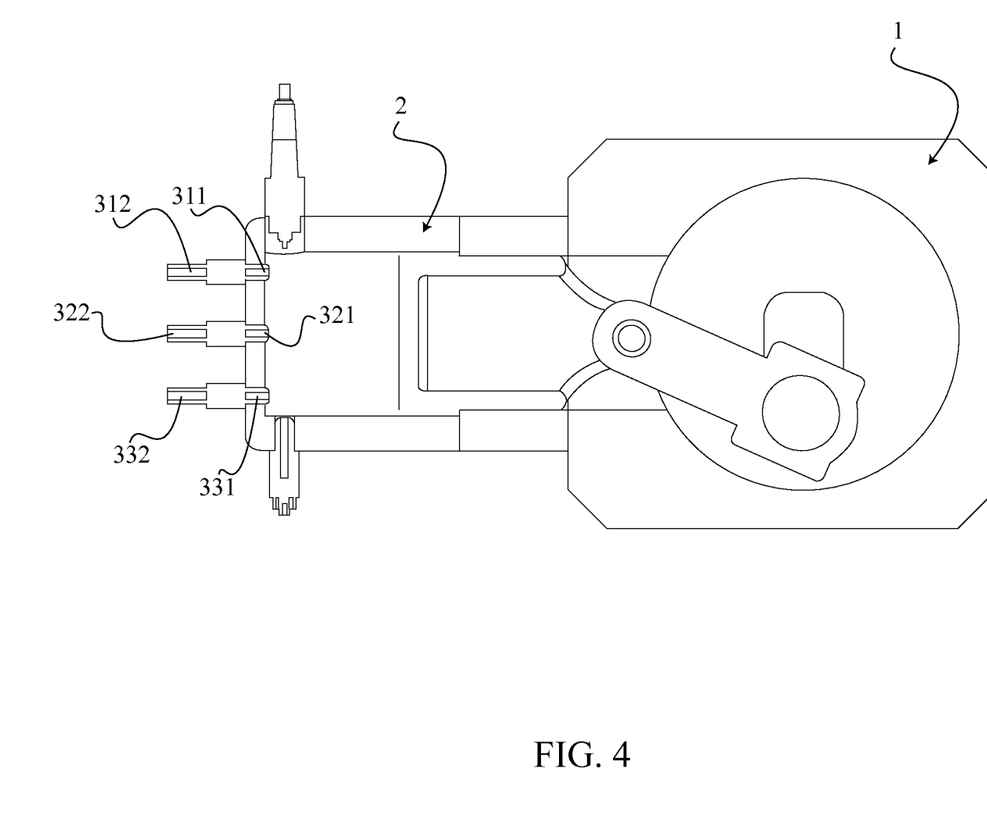
FIG. 4 is a view of the present invention in two hundred and seventy degree position.

At the hundred and eighty degree position, the ejector valve 27 opens and allows the water and the carbon monoxide gas or methane gas to exhaust out from the combustion chamber 2. The ejector valve 27 is inserted within the ejector valve chamber opening 28, and the ejector valve 27 is only open from the hundred and eighty degree position to zero degree position of the rotational crank 12 in the clockwise direction. The piston 26 starts to move downward, when the rotational crank 12 is at the hundred and eighty degree position. In reference to FIG. 4, the downward force of the piston 26 and two hundred seventy degree position of the rotational crank 12, eject the water and the carbon monoxide gas or methane gas through the ejector valve 27. The two hundred seventy degree position occurs within the present invention, when the rod connector 121 makes a two hundred seventy degree angle with the piston connector 261 in the clockwise direction. Ejected water and the carbon monoxide gas or methane gas disseminated into an appropriate vessel. The ejected water from the first method and second method can be filtered to be potable or electrolyzed using a salt solution. The carbon monoxide gas from the first method may be used as fuel itself or be further refine into any desired hydrocarbon compound so that the carbon monoxide gas can be used for different application. The heat from the first method and second method is utilized or allowed to escape from the combustion chamber 2 so that the present invention is not overheated. Once the rotational crank 12 moves to zero degree position, the ejector valve 27 is closed completing a cycle. After the rotational crank 12 moves to the zero degree position, another cycle starts with the present invention creating a continues pattern.

The carbon dioxide gas, oxygen gas, and hydrogen gas is used in order to achieve optimal energy output from the present invention, but other fuels may also be used within the present invention. The present invention can also operate as a static heat generator or be utilized in a combustion engine or turbine.

Although the invention has been explained in relation to its preferred embodiment, it is to be understood that many other possible modifications and variations can be made without departing from the spirit and scope of the invention as hereinafter claimed.

What is claimed is:
1. A carbon oxygen hydrogen motor comprises,
an enclosure;
a combustion chamber;
a plurality of injectors;
the enclosure comprises a housing, a rotational crank, and a rod;
the combustion chamber comprises a hydrogen injector chamber opening, an oxygen injector chamber opening, a carbon dioxide injector chamber opening, a spark plug, a spark plug chamber opening, a piston, an ejector valve, and an ejector valve chamber opening;
the plurality of injectors comprises a hydrogen injector, an oxygen injector, and a carbon dioxide injector;
the enclosure being connected to the combustion chamber;
the plurality of injector being connected to the combustion chamber;
the rotational crank and the piston being connected to each other by the rod;
the rotational crank comprises a rod connector;
the piston comprises a piston connector;
the rod comprises a first opening and a second opening;
the piston being positioned inside the combustion chamber;
the first opening being concentrically connected with the rod connector;
the second opening being concentrically connected with the piston connector;
the housing comprises a crank opening;
the rotational crank being concentrically positioned within the crank opening;

the hydrogen injector chamber opening, the oxygen injector chamber opening, and the carbon dioxide injector chamber opening being adjacently positioned on the combustion chamber below the piston;

the spark plug chamber opening being positioned on the combustion chamber perpendicular to the hydrogen injector chamber opening; and the ejector valve chamber opening being positioned on the combustion chamber opposite from the spark plug opening.

2. The carbon oxygen hydrogen motor as claimed in claim 1 comprises, the hydrogen injector being traversed through the hydrogen injector chamber opening;

the oxygen injector being traversed through the oxygen injector chamber opening;

the carbon dioxide injector being traversed through the carbon dioxide injector chamber opening;

the spark plug being inserted into the spark plug chamber opening; and the ejector valve being traversed through the ejector valve chamber opening.

3. The carbon oxygen hydrogen motor as claimed in claim 2 comprises, the hydrogen injector comprises a hydrogen injector inside opening and a hydrogen injector outside opening;

the oxygen injector comprises an oxygen injector inside opening and an oxygen injector outside opening;

the carbon dioxide injector comprises a carbon dioxide injector inside opening and a carbon dioxide injector outside opening;

the hydrogen injector inside opening being positioned inside the combustion chamber;

the hydrogen injector outside opening being positioned outside the combustion chamber;

the oxygen injector inside opening being positioned inside the combustion chamber;

the oxygen injector outside opening being positioned outside the combustion chamber;

the carbon dioxide injector inside opening being positioned inside the combustion chamber; and the carbon dioxide injector outside opening being positioned outside the combustion chamber.

4. A method of producing energy through a carbon oxygen hydrogen motor comprises the steps in combination of:

providing a combustion chamber, wherein the combustion chamber comprises a spark plug, an ejector valve, and a piston;

providing a rotational crank, wherein the rotational crank is interconnected with the piston by a rod;

providing a plurality of injectors, wherein the plurality of injectors comprises a hydrogen injector, an oxygen injector, and a carbon dioxide injector;

providing a plurality of reactants, wherein the plurality of reactants comprises hydrogen gas, oxygen gas, and carbon dioxide gas;

providing a plurality of products, wherein the plurality of products comprises a pressure force, water, and carbon monoxide gas or methane gas;

(1) rotating the rotational crank from a zero degree position to a ninety degree position;

(2) rotating the rotational crank from the ninety degree position to a hundred and eighty degree position;

(3) rotating the rotational crank from the hundred and eighty degree position to a two hundred and seventy degree position;

(4) rotating the rotational crank from the two hundred and seventy degree position to the zero degree position;

(5) perpetually repeating steps 1 through 4;

said step (1) further comprises the steps of: (1) injecting the hydrogen gas into the combustion chamber through the hydrogen injector, (2) simultaneously injecting the oxygen gas into the combustion chamber through the oxygen injector, (3) simultaneously injecting the carbon dioxide gas into the combustion chamber through the carbon dioxide injector, (4) closing the plurality of valves before the rotational crank reaches the ninety degree position, (5) driving the piston upward by the hydrogen gas, the oxygen gas, and the carbon dioxide, and (6) rotating the rotational crank by the rod;

said step (2) further comprises the steps of: (1) generating an electric spark by the spark plug, when the rotational crank reaches ninety degree position, (2) igniting the hydrogen gas, the oxygen gas, and the carbon dioxide by the electric spark causing a reaction, (3) creating the plurality of products within the combustion chamber by the reaction, and (4) driving the piston upward by the pressure force and rotating the rotational crank into hundred and eighty degree position;

said step (3) further comprises the steps of: (1) opening the ejector valve in order to exit the water and the carbon monoxide gas or the methane gas, (2) driving the piston downward by the loss of pressure force, and (3) rotating the rotational crank from the hundred and eighty degree position to the two hundred and seventy degree position by the rod; and said step (4) further comprises the steps of: (1) ejecting the water and the carbon monoxide gas or the methane gas, through the ejector valve, by the downward movement of the piston, and (2) closing the ejector valve when the rotational crank reaches zero degree position, where a cycle is completed.

5. A carbon oxygen hydrogen motor comprises, an enclosure;

a combustion chamber;

a plurality of injectors;

the enclosure comprises a housing, a rotational crank, and a rod;

the combustion chamber comprises a hydrogen injector chamber opening, an oxygen injector chamber opening, a carbon dioxide injector chamber opening, a spark plug, a spark plug chamber opening, a piston, an ejector valve, and an ejector valve chamber opening;

the plurality of injectors comprises a hydrogen injector, an oxygen injector, and a carbon dioxide injector;

the housing comprises a crank opening;

the enclosure being connected to the combustion chamber;

the plurality of injector being connected to the combustion chamber;

the rotational crank and the piston being connected to each other by the rod;

the rotational crank being concentrically positioned within the crank opening;

the rotational crank comprises a rod connector;

the piston comprises a piston connector;

the rod comprises a first opening and a second opening;

the piston being positioned inside the combustion chamber;

the first opening being concentrically connected with the rod connector;

the second opening being concentrically connected with the piston connector;

the hydrogen injector chamber opening, the oxygen injector chamber opening, and the carbon dioxide injector chamber opening being adjacently positioned on the combustion chamber below the piston;

the spark plug chamber opening being positioned on the combustion chamber perpendicular to the hydrogen injector chamber opening;

the ejector valve chamber opening being positioned on the combustion chamber opposite from the spark plug opening;

the hydrogen injector being traversed through the hydrogen injector chamber opening;

the oxygen injector being traversed through the oxygen injector chamber opening;

the carbon dioxide injector being traversed through the carbon dioxide injector chamber opening;

the spark plug being inserted into the spark plug chamber opening; and the ejector valve being traversed through the ejector valve chamber opening.

6. The carbon oxygen hydrogen motor as claimed in claim 5 comprises, the hydrogen injector comprises a hydrogen injector inside opening and a hydrogen injector outside opening;

the oxygen injector comprises an oxygen injector inside opening and an oxygen injector outside opening;

the carbon dioxide injector comprises a carbon dioxide injector inside opening and a carbon dioxide injector outside opening;

the hydrogen injector inside opening being positioned inside the combustion chamber;

the hydrogen injector outside opening being positioned outside the combustion chamber;

the oxygen injector inside opening being positioned inside the combustion chamber;

the oxygen injector outside opening being positioned outside the combustion chamber;

the carbon dioxide injector inside opening being positioned inside the combustion chamber; and the carbon dioxide injector outside opening being positioned outside the combustion chamber.

* * * * *